United States Patent [19]
Kuroda et al.

[11] Patent Number: 5,388,454
[45] Date of Patent: Feb. 14, 1995

[54] DEVICE FOR DETECTING DETERIORATION OF A CATALYST TEMPERATURE SENSOR

[75] Inventors: Shigetaka Kuroda; Yoichi Iwata, both of Wako, Japan

[73] Assignee: Honda Giken Kogyo K.K., Tokyo, Japan

[21] Appl. No.: 164,685

[22] Filed: Dec. 8, 1993

Related U.S. Application Data

[63] Continuation of Ser. No. 752,074, Aug. 29, 1991, abandoned.

[30] Foreign Application Priority Data

Sep. 5, 1990 [JP] Japan .................................. 2-236853

[51] Int. Cl.$^6$ .......................................... G01M 15/00
[52] U.S. Cl. ................................................ 73/118.1
[58] Field of Search ................. 73/118.1, 117.3, 116; 340/449, 459; 60/277; 374/144; 123/693, 688

[56] References Cited

U.S. PATENT DOCUMENTS

| | | | |
|---|---|---|---|
| 4,177,787 | 12/1979 | Hattori et al. | 60/277 |
| 4,274,381 | 6/1981 | Abo | 60/285 |
| 4,534,214 | 8/1985 | Takahashi | 73/117.3 |
| 5,107,246 | 4/1992 | Mogaki | 73/118.1 |

FOREIGN PATENT DOCUMENTS 223427 10/1987 Japan .

Primary Examiner—Hezron E. Williams
Assistant Examiner—Nashmiya Ashraf
Attorney, Agent, or Firm—Arthur L. Lessler

[57] ABSTRACT

A device for detecting deterioration of a catalyst temperature sensor which detects the temperature of a three-way catalyst arranged in the exhaust pipe of an internal combustion engine, judges that the sensor has deteriorated when the difference between the actual output value from the catalyst temperature sensor and a reference value based on predetermined engine operating parameters exceeds a predetermined value while the engine is in a predetermined operating condition.

5 Claims, 3 Drawing Sheets

DEVICE FOR DETECTING DETERIORATION OF A CATALYST TEMPERATURE SENSOR

This application is a continuation, of application Ser. No. 07/752,074, filed Aug. 29, 1991, now abandoned.

BACKGROUND OF THE INVENTION

This invention relates to a device for detecting deterioration of a sensor for detecting the temperature of a three-way catalyst installed in the exhaust pipe of an internal combustion engine.

A device for protecting a three-way catalyst installed in the exhaust pipe of an internal combustion engine by increasing the amount of fuel supplied to the engine when the temperature of the catalyst detected by a sensor fitted to the catalyst is above a predetermined value, is disclosed for example in Japanese Provisional Patent Publication (Kokai) No. 62-223427.

However, in this device, the sensor which detects the catalyst temperature also deteriorates with time so that it no longer performs accurate detection, and the catalyst is no longer protected. As a result, if the sensor indicates a lower value than the actual catalyst temperature, the amount of fuel supplied to the engine is not increased although the actual catalyst temperature is above the predetermined value. This impairs exhaust emission characteristics.

On the other hand, if the sensor indicates a higher value than the actual catalyst temperature, the amount of fuel supplied to the engine is increased unnecessarily and exhaust emission characteristics are again impaired.

SUMMARY OF THE INVENTION

It is the object of the invention to provide a device which, by detecting the deterioration of a catalyst temperature sensor, prevents various controls such as fuel supply control from being carried out based on incorrect output values from the sensor, as well as prevent deterioration of the catalyst and degraded exhaust emission characteristics.

To achieve the above object, this invention provides a device for detecting deterioration of a sensor for detecting the temperature of a catalyst for purifying noxious ingredients of exhaust gases in an internal combustion engine, the device comprising:
  means for determining whether or not the difference between an actual output value from the sensor and a reference value based on predetermined operating parameters of the engine exceeds a predetermined value while the engine is in a predetermined operating condition, and
  means for judging that deterioration of the sensor has occurred when the difference exceeds the predetermined value.

Preferably, the predetermined operating parameters of the engine include at least one of intake temperature, engine temperature, engine rotational speed, and engine load.

Also preferably, the means for judging deterioration judges that deterioration of the sensor has occurred when the difference has continuously exceeded the predetermined value for a predetermined time period.

Preferably, the predetermined operating condition of the engine is a condition in which at least one of intake temperature, engine temperature, engine rotational speed, and engine load lies within a predetermined intermediate range.

The above and other objects, features and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
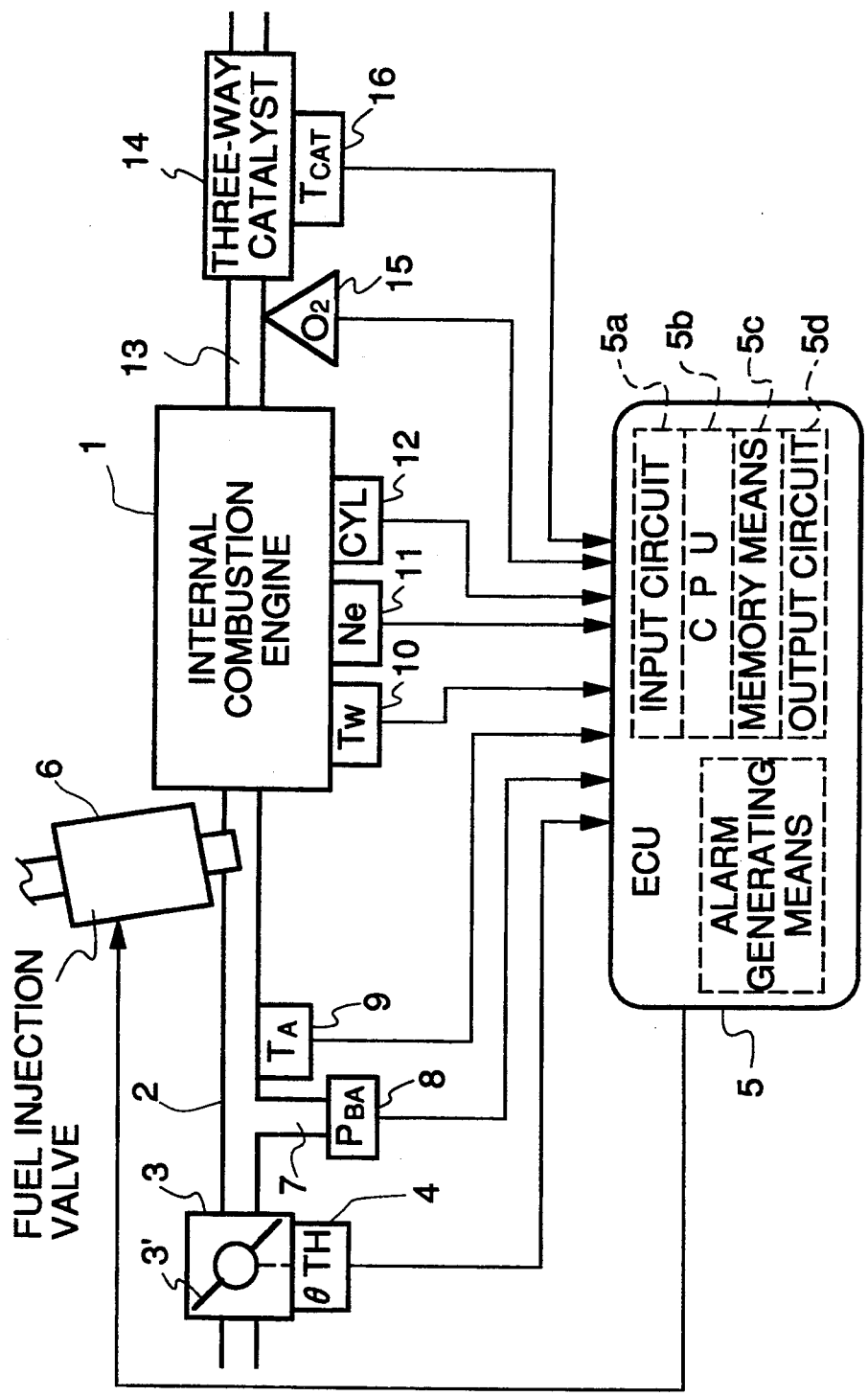
FIG. 1 is a block diagram of the whole arrangement of a fuel supply control system of an internal combustion engine including a device for detecting deterioration of a catalyst temperature sensor according to the invention.

Referring first to FIG. 1, there is shown the whole arrangement of a fuel supply control system of an internal combustion engine including a device for detecting deterioration of a catalyst temperature sensor according to the invention. In the figure, reference numeral 1 designates an internal combustion engine which is a four-cylinder type, for example. A throttle body 3 is provided in an intake pipe 2, and a throttle valve 3' is disposed in the throttle body. A throttle valve opening ($\Theta_{TH}$) sensor 4 is connected to the throttle valve 3', and supplies an electrical signal indicative of the opening of the throttle valve 3' to an electronic control unit 5 (referred to hereinafter as "the ECU").

A fuel injection valve 6 is provided for each engine cylinder and arranged at a location between the engine 1 and the throttle valve 3' slightly upstream of an intake valve, not shown, in the intake pipe 2. These fuel injection valves are connected to a fuel pump, not shown. They are electrically connected to the ECU 5, and their opening periods are controlled by signals therefrom.

An intake pipe absolute pressure ($P_{BA}$) sensor 8 is arranged immediately downstream of the throttle valve 3' via a conduit 7 for supplying an electrical signal indicative of the sensed absolute pressure to the ECU 5. Further, an intake temperature ($T_A$) sensor 9 is arranged downstream of the absolute pressure sensor 8 for supplying an electrical signal indicative of the sensed intake temperature to the ECU 5.

An engine coolant temperature ($T_W$) sensor 10, which may be formed of a thermistor or the like, is mounted in the cylinder block of the engine 1 for supplying an electrical signal indicative of the sensed engine coolant temperature $T_W$ to the ECU 5. An engine rotational speed (Ne) sensor 11 and a cylinder-discriminating (CYL) sensor 12 are arranged in facing relation to a camshaft or a crankshaft of the engine 1, none of which is shown. The engine rotational speed sensor 11 generates a signal pulse (referred to hereinafter as a TDC signal pulse) at predetermined crank angles whenever the crankshaft of the engine 1 rotates through 180°. The cylinder-discriminating sensor 12 generates a signal pulse at a predetermined crank angle of a particular cylinder. All these signal pulses are supplied to the ECU 5, which computes the engine speed based on the TDC signal pulses.

A three-way catalyst 14 is arranged within an exhaust pipe 13 of the engine 1 to purify noxious ingredients of the exhaust gases such as HC, CO and $NO_x$. An $O_2$ sensor 15 is mounted in the exhaust pipe 13 at a location upstream of the three-way catalyst 14 as an air-fuel ratio sensor for sensing the concentration of oxygen present in the exhaust gases, which corresponds to the air-fuel ratio, and supplying a signal indicative of the detected concentration to the ECU 5.

Further, a catalyst temperature ($T_{CAT}$) sensor 16 is mounted on the three-way catalyst 14 for sensing its temperature, and supplying a signal indicative of the sensed temperature $T_{CAT}$ to the ECU 5.

In this embodiment, the ECU 5 comprises a means for detecting deterioration of the catalyst temperature sensor 16. The ECU 5 comprises an input circuit 5a having the functions of shaping the waveforms of input signals from various sensors, correcting the voltage levels of input signals from some sensors to a predetermined level, converting analog signals from analog-output sensors to digital signals, and so forth; a central processing unit (referred to hereinafter as "the CPU") 5b; a memory means 5c which stores computing programs executed by the CPU 5b and computation results; and an output circuit 5d which supplies driving signals to the fuel injection valves 6.

The CPU 5b, based on the aforementioned signals from the sensors, determines the conditions under which the engine 1 is operating, such as an air-fuel ratio feedback control region wherein the fuel supply is controlled in response to the oxygen concentration in the exhaust gases, and open-loop control regions. The CPU 5b then calculates the fuel injection period of the fuel injection valves 6 in synchronism with TDC signal pulses according to engine operating conditions, and driving signals are supplied to the valves 6 through the circuit 5d which open the valves 6 for a time period corresponding to the calculated fuel injection period.

The catalyst temperature sensor 16 detects the temperature $T_{CAT}$ of the three-way catalyst 14. When this temperature is above a predetermined value, the amount of fuel supplied to the engine is increased and the three-way catalyst 14 is thereby protected.

Figure 2:
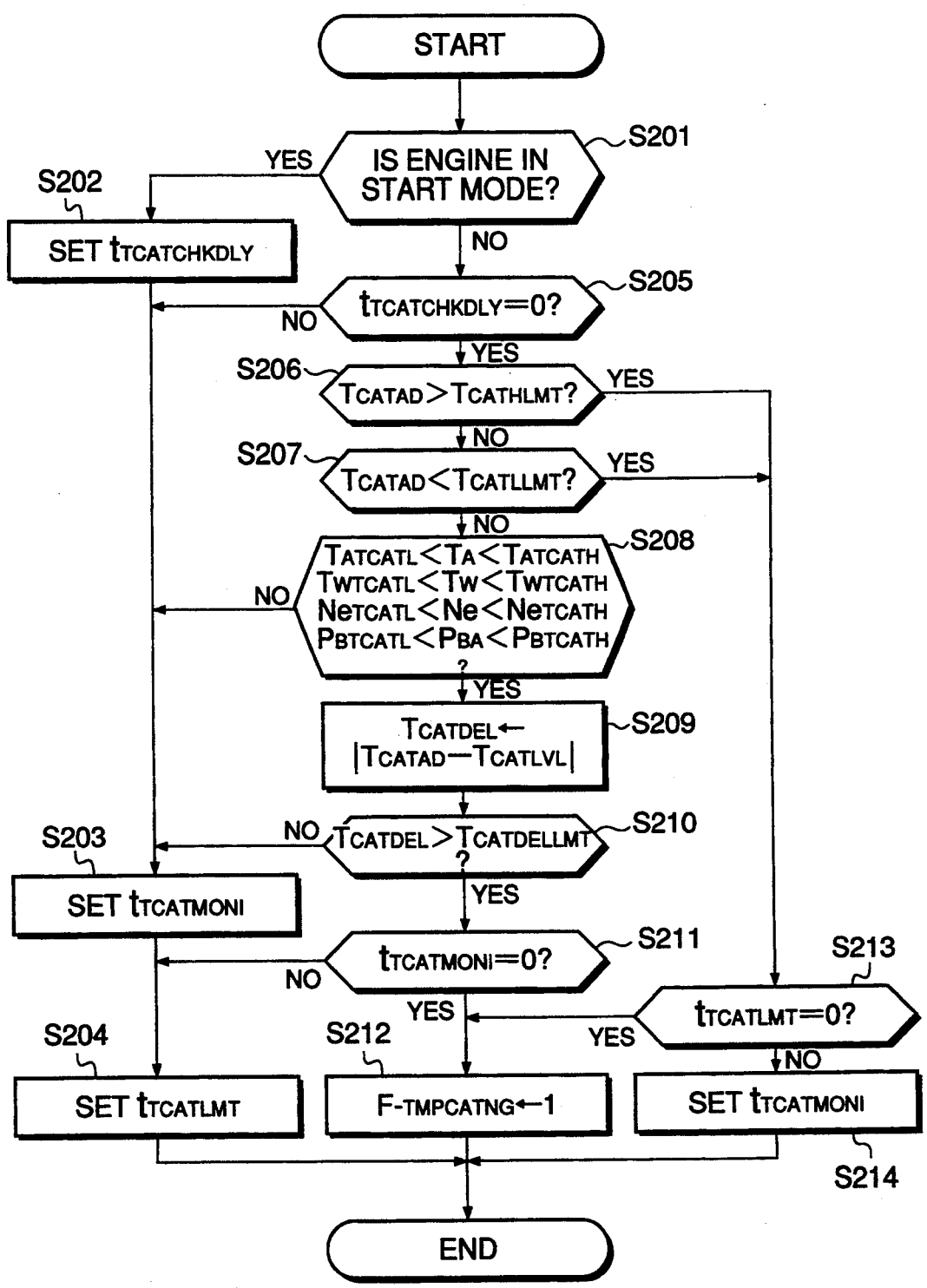
FIG. 2 is a flowchart of a program showing the procedure for detecting deterioration of the catalyst temperature sensor executed by a CPU $5b$ in FIG. 1.

The above procedure for detecting deterioration of the sensor 16 for detecting the catalyst temperature $T_{CAT}$ executed by the CPU 5b of the fuel supply control system of the aforementioned construction, will now be described in detail with reference to a control program illustrated in FIG. 2. This program is executed whenever a TDC signal pulse is generated.

First, at a step 201, it is determined whether or not the engine 1 is in starting operation mode. If the answer to this question is affirmative (Yes), a catalyst temperature rise delay timer consisting of a down counter for measuring the time having elapsed after transition from the starting operation mode of the engine 1 to normal operation mode of same, i.e. a $t_{TCATCHKDLY}$ timer, is set to a predetermined time period required for the three-way catalyst 14 to become active after heating, $t_{TCATCHK-DLY}$ (e.g. 10 seconds), and the timer is started (step 202). Further, a $t_{TCATMONI}$ timer for measuring a time period during which the difference between the temperature of the three-way catalyst 14 $T_{CATAD}$ and its correct temperature $T_{CATLVL}$ exceeds a predetermined value $T_{CAT-DELLMT}$, is set to a predetermined time period $t_{TCAT-MONI}$ (e.g. 10 seconds) and the timer is started (step 203). Then, a catalyst temperature sensor limit monitor timer consisting of a down counter for measuring a time period during which the A/D converted value $T_{CATAD}$ of the catalyst temperature sensor output current $T_{CAT}$ lies above an upper limit $T_{CATHLMT}$ or below a lower limit $T_{CATLLMT}$ of the catalyst temperature range exhibited by the three-way catalyst when it is functioning normally, i.e. a $t_{TCATLMT}$ timer, is set to a predetermined time period $t_{TCATLMT}$ (e.g. 10 seconds), the timer is started (step 204), and the program is terminated. If on the other hand the answer to the question at the step 201 is negative (No), it is determined whether or not the count value of the timer $t_{TCATCHKDLY}$ is equal to 0 (step 205). If the answer to this question is negative (no), it is judged that the engine operating condition is inappropriate for detecting deterioration of the catalyst temperature sensor 16, and the program proceeds to steps 203 and 204. If on the other hand the answer at the step 205 becomes affirmative (Yes) after the predetermined time period $t_{TCATCHKDLY}$ has elapsed following transition of the engine 1 to the normal operation mode, the program proceeds to a step 206.

Figure 3:
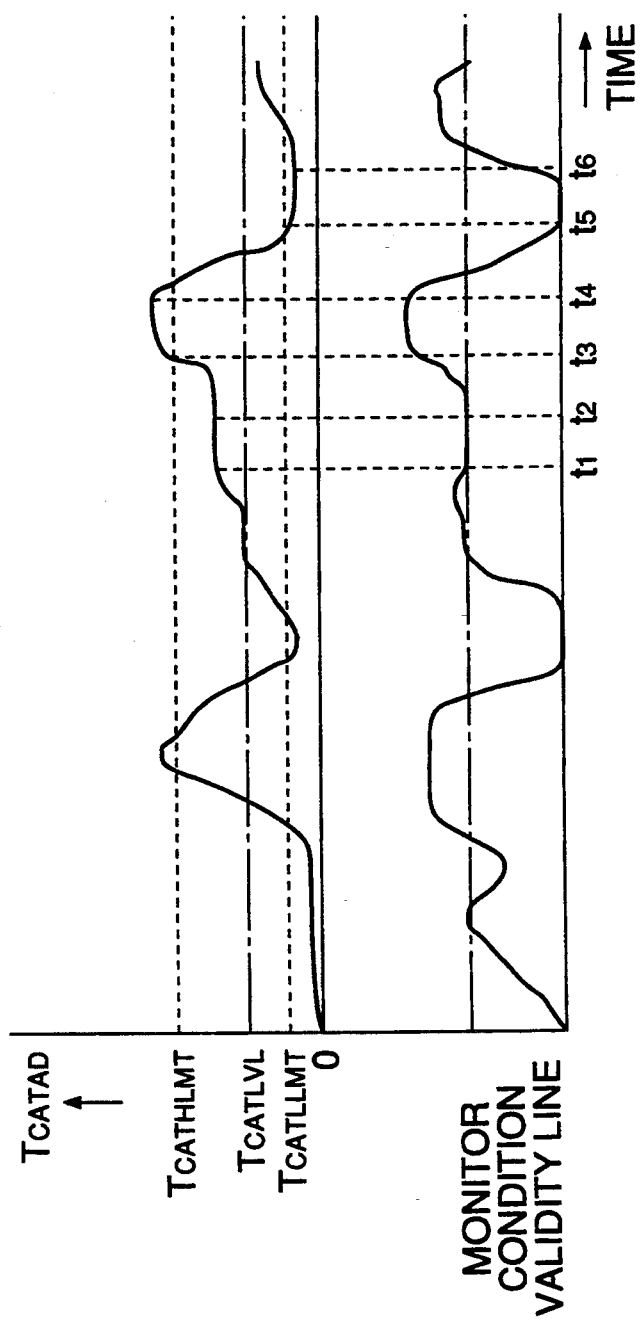
FIG. 3 is a view useful in explaining the deterioration of a catalyst temperature sensor.

At the step 206, it is determined whether or not the A/D value $T_{CATAD}$ of the catalyst temperature sensor output current is higher than the upper limit $T_{CATHLMT}$ (e.g. corresponding to 200 mA). If the answer to this question is affirmative (Yes), the program proceeds to a step 213 where it is determined whether or not the count value of the timer $t_{TCATLMT}$ is equal to 0. If the answer to this question is affirmative (Yes), i.e. if the A/D value $T_{CATAD}$ of the output current from the catalyst temperature sensor 16 has continuously exceeded the upper limit $T_{CATHLMT}$ for the predetermined time period $t_{TCATLMT}$ ($t_3$–$t_4$ in FIG. 3), it is judged that deterioration has occurred in the catalyst temperature sensor 16, and a catalyst temperature sensor performance NG flag $F_{-TMPCATNG}$ is set equal to 1 at a step 212. If on the other hand the answer at the step 213 is negative (No), the $t_{TCATMONI}$ timer is set to the predetermined time $t_{TCATMONI}$, the timer is started (step 214) and the program is terminated.

If the answer to the question at the step 206 is negative (No), the program proceeds to a step 207, it is determined whether or not the A/D value $T_{CATAD}$ of the catalyst temperature sensor output current is lower than the lower limit $T_{CATLLMT}$ (e.g. corresponding to 0.1 mA). If the answer to this question is affirmative (Yes), the program proceeds to the step 213 where it is determined whether or not the count value of the timer $t_{CATLMT}$ is equal to 0. If the answer to this question is affirmative (Yes), i.e. if the A/D value $T_{CATAD}$ of the output current from the catalyst temperature sensor 16 has continuously been below the lower limit $T_{CATLLMT}$ for the predetermined time period $t_{CATLMT}$ ($t_5$–$t_6$ in FIG. 3), it is judged that deterioration has occurred in the catalyst temperature sensor 16, and the catalyst temperature sensor performance NG flag $F_{-TMPCATNG}$ is set equal to 1 at the step 212. If on the other hand the answer at the step 213 is negative (No), the $t_{TCATMONI}$ timer is set to the predetermined time $t_{TCATMONI}$, the timer is started (step 214) and the program is terminated.

If the answers to the questions at both steps 206 and 207 are negative (No), i.e. if the A/D value $T_{CATAD}$ of the output current of the catalyst temperature sensor 16 is no higher than the upper limit $T_{CATHLMT}$ and no lower than the lower limit $T_{CATLLMT}$, the program proceeds to a step 208 where it is determined whether or not the engine is in a predetermined operating condition, i.e. whether the intake temperature $T_A$, engine coolant temperature $T_W$, engine rotational speed Ne and absolute pressure $P_{BA}$ in the intake pipe 2, are within respective predetermined ranges. More specifically, it is determined:

i) whether or not the intake temperature $T_A$ is within a range defined by an upper limit $T_{ATCATH}$ of the catalyst temperature sensor monitor intake temperature (e.g. 100° C.) and a lower limit $T_{ATCATL}$ of same (e.g. 20° C.);

ii) whether or not the engine coolant temperature $T_W$ is within a range defined by an upper limit $T_{WTCATH}$ of the catalyst temperature sensor monitor coolant temperature (e.g. 100° C.) and a lower limit $T_{WTCATL}$ of same (e.g. 50° C.);

iii) it is determined whether or not the engine rotational speed Ne is within a range defined by an upper limit $Ne_{TCATH}$ of the catalyst temperature sensor monitor Ne (e.g. 2200 r.p.m.) and a lower limit $Ne_{TCATL}$ of same (e.g. 1800 r.p.m.); and iv) it is determined whether or not the absolute pressure $P_{BA}$ in the intake pipe 2 is within a range defined by an upper limit $P_{BTCATH}$ of the catalyst temperature sensor monitor $P_{BA}$ (e.g. 380 mmHg) and a lower limit $P_{BTCATL}$ of same (e.g. 340 mmHg).

If any one of the above-mentioned conditions i) to iv) is not satisfied, i.e. if the answer to the question at the step 208 is negative (No), it is judged that the engine is not in the predetermined operating condition and that its is condition is inappropriate for for detecting deterioration of the catalyst temperature sensor. The program is then terminated after executing the steps 203 and 204.

If on the other hand all the aforementioned conditions at the step 208 are satisfied, i.e. if the answer to the question at the step 208 is affirmative (Yes), it is judged that the engine is in the predetermined operating condition and that its condition is appropriate for detecting deterioration of the catalyst temperature sensor, and then the program proceeds to a step 209. In the step 209, the absolute value of the difference between the A/D value $T_{CATAD}$ of the output current from the catalyst temperature sensor 16 and a correct value $T_{CATLVL}$ which should be outputted by the catalyst temperature sensor 16 based on the intake temperature $T_A$, coolant temperature $T_W$, engine rotational speed Ne and absolute pressure $P_{BA}$ in the intake pipe 2 when the conditions of the step 208 are satisfied, is computed, and this computed value is taken as a catalyst temperature sensor output current level shift $T_{CATDEL}$.

The output current $T_{CATLVL}$ may also be taken to be a fixed value (e.g. corresponding to 3 mA). Then, in a step 210, it is determined whether or not the output current level shift $T_{CATDEL}$ of the catalyst temperature sensor 16 exceeds the predetermined value $T_{CATDELLMT}$ (e.g. corresponding to 0.2 mA) which is an upper limit of the catalyst temperature sensor output current level shift $T_{CATDEL}$. If the answer to this question is negative (No), it is judged that deterioration of the catalyst sensor 16 has not occurred, and the program is terminated after executing the steps 203 and 204.

If on the other hand the answer to the question at the step 210 is affirmative (Yes), the program proceeds to a step 211 where it is determined whether or not the count value of the $t_{TCATMONI}$ timer is equal to 0. If the answer to this question is negative (No), the program is terminated after executing the step 204. If on the other hand the answer is affirmative (Yes), i.e. if the output current level shift $T_{CATDEL}$ of the catalyst temperature sensor has continuously exceeded the upper limit $T_{CATDELLMT}$ of the output current level shift $T_{CATDEL}$ for the predetermined time period $t_{TCATMONI}$ ($t_1$-$t_2$ in FIG. 3), it is judged that deterioration of the catalyst temperature sensor 16 has occurred. Then, in the step 212, the catalyst temperature sensor performance NG flag $F_{-TMPCATNG}$ is set equal to 1, and the program is terminated. Further, when the NG flag $F_{-TMPCATNG}$ is equal to 1, the device follows another program to generate an alarm and execute a fail-safe routine.

As described in detail hereinabove, the device for detecting deterioration of a catalyst temperature sensor according to the invention judges that such deterioration has occurred when the difference between the output of the sensor and a reference value based on the predetermined operating parameters of the engine as determined in the step 208, exceeds a predetermined value while the engine is in a predetermined operating condition. Deterioration of the catalyst temperature sensor can thus be detected with reliability.

What is claimed is:

1. A device for detecting deterioration of a catalyst temperature sensor for detecting a value of the temperature of a catalyst for purifying noxious ingredients of exhaust gases in an internal combustion engine, and providing an electrical signal indicative of the detected value, the device comprising:

a plurality of sensors for providing electrical sensor signals having values indicative of particular operating parameters of said engine;

determining means for processing said electrical sensor signals to determine whether or not (i) a difference between an actual output value from said catalyst temperature sensor and a reference value which should be outputted from said catalyst temperature sensor based upon values of said particular operating parameters of said engine indicated by said electrical sensor signals when said engine is in a certain operating condition, determined when a value of at least one of said particular operating parameters is in a predetermined range, exceeds (ii) a predetermined value while said engine is in said certain operating condition;

judging means for providing a warning signal indicating that deterioration of said catalyst temperature sensor has occurred, when said determining means determines that said difference exceeds said predetermined value while said engine is in said certain operating condition; and alarm generating means responsive to said warning signal for generating an alarm when said judging means has judged that deterioration of said catalyst temperature sensor has occurred.

2. The device according to claim 1, wherein said certain operating condition of said engine is an operating condition in which at least one of said values of said particular operating parameters indicated by said plurality of sensors lies within a predetermined intermediate range.

3. The device according to claim 1 or 2, wherein said plurality of sensors include at least one of an intake temperature sensor for detecting the temperature of intake air supplied to said engine, an engine temperature sensor for detecting the temperature of a coolant of said engine, and an engine rotational speed sensor for detecting the rotational speed of said engine, or an intake pressure sensor for detecting intake pressure of said engine.

4. The device according to claim 1 or 2, wherein said judging means judges that deterioration of said catalyst temperature sensor has occurred when said difference has continuously exceeded said predetermined value for a predetermined time period.

5. A device for detecting deterioration of a catalyst temperature sensor for detecting the temperature of a catalyst for purifying noxious ingredients of exhaust gases in an internal combustion engine, and providing an electrical signal indicative of the detected value, the device comprising:

a plurality of engine operating parameter sensors including at least one of (i) an intake temperature sensor for detecting the temperature of intake air supplied to said engine, (ii) an engine temperature sensor for detecting the temperature of a coolant of the engine, (iii) an engine rotational speed sensor for detecting the rotational speed of said engine, or (iv) an intake pressure sensor for detecting intake pressure of said engine, for providing electrical sensor signals having values indicative of values of particular operating parameters of said engine;

an electronic control unit including an input circuit responsive to said electrical sensor signals, a central processing unit coupled to said input circuit, a memory coupled to said central processing unit, and an output circuit coupled to said central processing unit, said electronic control unit including (a) determining means for determining whether or not (i) a difference between an actual output value from said catalyst temperature sensor and a reference value which should be outputted from said catalyst temperature sensor based upon values of said particular operating parameters of said engine corresponding to said electrical sensor signals when said engine is in a certain operating condition, determined when a value of at least one of said particular operating parameters is in a predetermined range, exceeds (ii) a predetermined value while said engine is in said certain operating condition, and (b) judging means for judging that deterioration of said catalyst temperature sensor has occurred when said determining means determines that said difference exceeds said predetermined value while said engine is in said certain operating condition; and alarm generating means coupled to said electronic control unit for generating an alarm when said judging means has judged that deterioration of said catalyst temperature sensor has occurred.

* * * * *